United States Patent [19]

Jost et al.

[11] Patent Number: 4,977,526

[45] Date of Patent: Dec. 11, 1990

[54] METHOD AND SYSTEM FOR CONTROLLING A DIFFERENTIAL DOSING SCALE

[75] Inventors: Gerhard Jost, Muehltal; Hans Werner, Darmstadt, both of Fed. Rep. of Germany

[73] Assignee: Carl Schenck AG, Darmstadt, Fed. Rep. of Germany

[21] Appl. No.: 192,396

[22] Filed: May 10, 1988

[30] Foreign Application Priority Data

May 21, 1987 [EP] European Pat. Off. ........ 87107367.2

[51] Int. Cl.$^5$ .................. G01G 13/00; G05B 13/02
[52] U.S. Cl. ............................. 364/567; 364/579; 364/571.01; 364/162
[58] Field of Search ............... 364/162, 163, 567, 568, 364/579, 578, 571.01, 571.05; 318/561

[56] References Cited

U.S. PATENT DOCUMENTS

| | | | |
|---|---|---|---|
| Re. 30,967 | 6/1982 | Ferrara et al. | 364/479 |
| Re. 32,102 | 4/1986 | Ricciardi et al. | 364/479 |
| 4,275,439 | 6/1981 | Kuwata | 364/163 |
| 4,301,501 | 11/1981 | Carter et al. | 363/62 |
| 4,320,855 | 3/1982 | Ricciardi et al. | 364/479 |
| 4,630,189 | 12/1986 | Ohmori et al. | 364/162 |
| 4,639,853 | 1/1987 | Rake et al. | 364/162 |
| 4,719,561 | 1/1988 | Shigemasa | 364/163 |
| 4,775,949 | 10/1988 | Kalata | 364/567 |

FOREIGN PATENT DOCUMENTS 2754527 6/1978 Fed. Rep. of Germany .
3225811 1/1984 Fed. Rep. of Germany ...... 364/162

OTHER PUBLICATIONS

Control Engineering Jun. 1984, "Self-Tuning PID Controller Uses Pattern Recognition Approach", TW Kraus et al., pp. 106–111.

Primary Examiner—Kevin J. Teska
Attorney, Agent, or Firm—W. G. Fasse; D. H. Kane, Jr.

[57] ABSTRACT

In a method and system for controlling a differential dosing scale having a weighing device and a control for the delivery rate especially of loose bulk material achieved by comparison of rated and actual weight values, measures are taken to eliminate the effects of disturbances of the output signal of the weighing device. Improvements are achieved in that an estimated or predicted value (G) for the next measured weight value is derived from previously measured values ($G_i$) of the output signal (G) of the weighing device. The predicted value (G) is compared with the next actual measured value ($G_i$) to determine a difference. If this difference exceeds a prescribed tolerance range or value, the control of the delivery rate continues at the unchanged previous actual value (P) of the delivery rate. Thus, the effects of disturbances are greatly reduced or even completely eliminated. Changes in the rated value of the delivery rate can also be taken into account. A differential dosing scale for carrying out the method includes appropriate hardware components or software for achieving the described control.

7 Claims, 4 Drawing Sheets

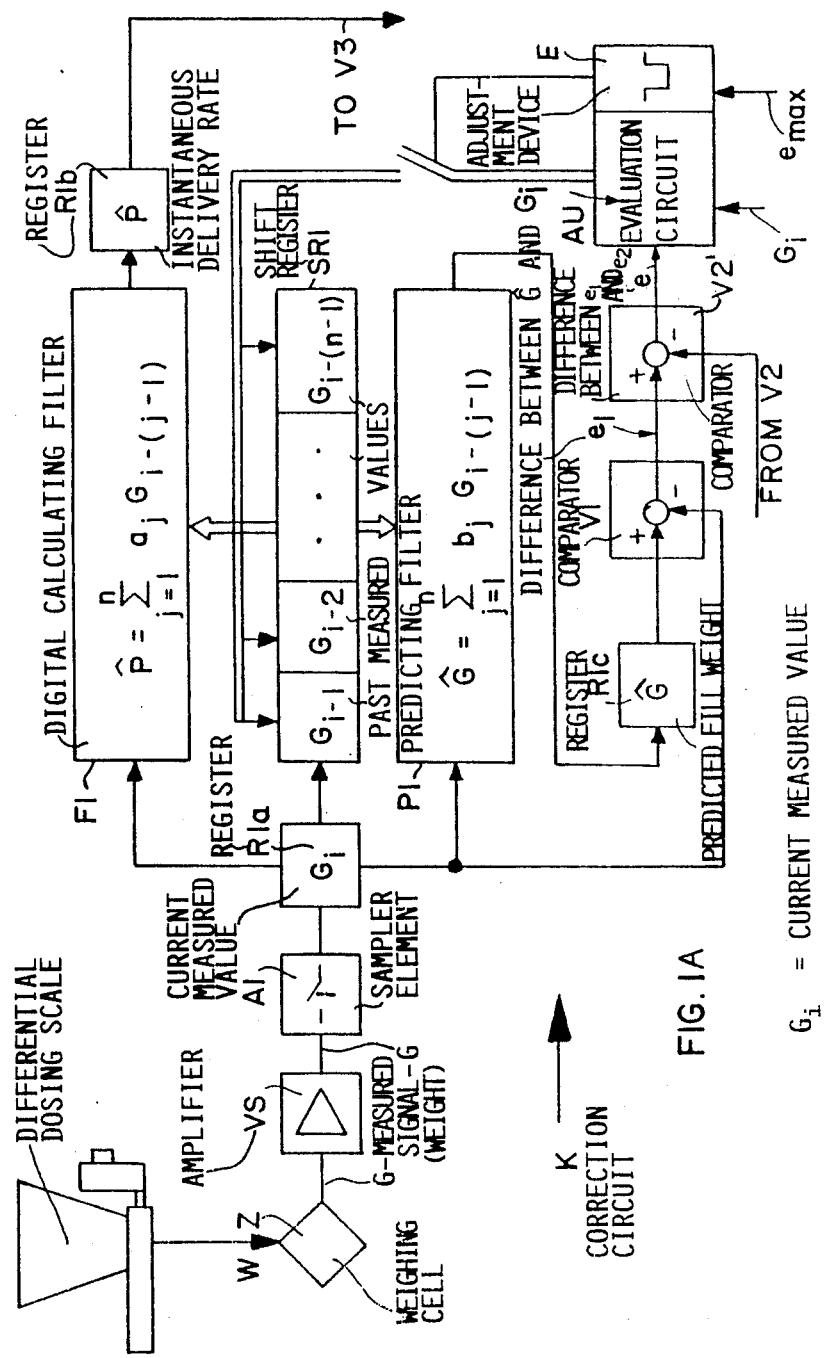

METHOD AND SYSTEM FOR CONTROLLING A DIFFERENTIAL DOSING SCALE

FIELD OF THE INVENTION

The invention relates to a method for controlling a differential dosing scale, especially one for dosing or weighing loose bulk material. The invention further relates to a system for controlling a differential dosing scale in accordance with the present method.

DESCRIPTION OF THE PRIOR ART

In such scales in general, the output signal of a weighing apparatus is continually measured and stored. The measured output signal values are used for determining the delivery rate or discharge rate of the dosing scale. The delivery rate or output quantity of the dosing scale is then controlled by comparing rated or reference values with measured or actual values. In the event of trouble or of a disturbance causing a deviation of the output signal of the weighing apparatus from a predetermined tolerance range, steps are taken to eliminate the trouble or disturbance.

Differential dosing scales work on the principle of a gravimetrically controlled removal of material from a container. The mechanical components of such a differential dosing scale include a weighing apparatus, a container mounted on the weighing apparatus for receiving the loose bulk material, and some means, such as a worm screw, for extracting a controllable stream of loose material from the container. The closed loop control of such a differential dosing scale is achieved by adjusting, for example, the rotational speed of the discharge screw so that the rate of reduction of the weight of the material in the container corresponds to the prescribed rated value of the material delivery rate.

In such a known method, the differential of the container weight is controlled in a closed loop manner. Especially for small delivery rates, the necessary control effect must often be determined from relatively small changes in the measured signal. As a result, a differential dosing scale of this type reacts very sensitively, for example, to any unintentional jarring or other physical contact of the weighing equipment. Such contact thus results in an erroneous dosing of material if no corrective measures are taken in the signal processing.

German Pat. Publication (DE-OS) No. 2,754,527 corresponding to U.S. Pat. Re. No. 32,102, describes a system for recognizing abrupt signal disturbances in differential dosing scales. In the known system the discharge time is divided into time intervals. Samples are taken of the container weight during these time intervals. Troubles or disturbances are recognized by a computer evaluating the slope of the current discharge curve during a time interval from values sampled during that time interval. The determined current slope is compared to a slope which was calculated from values sampled during a previous time interval. Any change in the correction signal, in other words every control effect, is suppressed or blocked if a comparison yields a difference between the previous and the current slopes, which exceeds a prescribed difference threshold value. Further dosing is then carried out volumetrically until the disturbance has ended.

The above known method has the disadvantage that the response sensitivity or threshold must be adjusted so that normal operating changes in the above mentioned difference value, due to changes of the feed rate setpoint, cannot lead to an interference or disturbance. The "guide value" in this context is the given rated value.

Because this known method and arrangement operate with time intervals, whereby a certain number of sampling points defines a time interval, a correction for the subsequent measured values is only possible after the next time interval has expired. This necessarily leads to a reduced control speed.

OBJECTS OF THE INVENTION

In view of the foregoing it is the aim of the invention to achieve the following objects singly or in combination:

to provide an improved method and system for controlling a differential dosing scale, whereby the control is stabilized against signal interference caused, for example, by physical disturbances of the dosing scale;

to avoid the use of relatively small signal levels or changes for determining control adjustments in such a method and system;

to avoid the need of setting a response sensitivity on the basis of expected operating signal fluctuations in such a method and system;

to achieve a fast control response in such a method and system by considering each sample point instantaneously instead of considering time interval groupings;

to allow the control to adapt to changes in the rated value of the delivery rate;

to allow the control, signal integration, and indication to continue practically uninfluenced by momentary interferences; and to provide a system for controlling a differential dosing scale in accordance with the present method, whereby the dosing scale itself may have a relatively simple and efficient construction.

SUMMARY OF THE INVENTION

The above objects have been achieved in a method and system for controlling a differential dosing scale, especially for loose bulk materials, according to the invention, in which a prediction or predicted value for the next value of the material container weight to be measured, is determined from the past history of the weight or in other words from the past measured values of the container weight as determined by the differential dosing scale. The predicted value is then compared with the next actually measured value. If no interfering forces or unintentional physical disturbances act on the container, then the actual new measured weight value corresponds quite exactly to the previously calculated predicted value. If, however, an interfering or disturbing force acts on the container, then a deviation arises and is detected through the comparison. If the deviation is within an acceptable tolerance range it is suppressed in that a new predicted value is determined on the basis of the measured value affected by the interfering force. The new predicted value is calculated on the assumption that the actual conveying quantity has not changed so that the control continues, using the unchanged actual value of the delivery rate as determined by the calculation or rather back-calculation. The interference or disturbance therefore has no effect, and the control, integration, and indication may continue practically uninfluenced by the interference or disturbance. By back-calculating new estimated or predicted values on the basis of measured values subject to the interfering or disturbing force, it is possible to accurately obtain an actual conveying quantity value which is not affected by a disturbing force that is within a permissible limit or tolerance range.

Changes in the rated value of the delivery rate may be taken into account in that the deviation between the measured value and the predicted value, due to a change in the rated delivery rate value, is compensated or suppressed in the signal processing in the same way as when the output signal of the weighing apparatus deviates within a permitted range. Thus, changes in the rated value do not become effective as an interference or disturbance, and the control quickly adapts itself to the changed rated delivery rate value.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

The invention can be applied to all differential dosing scales using weighing cells or any other suitable force measuring device such as load cells or the like.

Figure 1B:
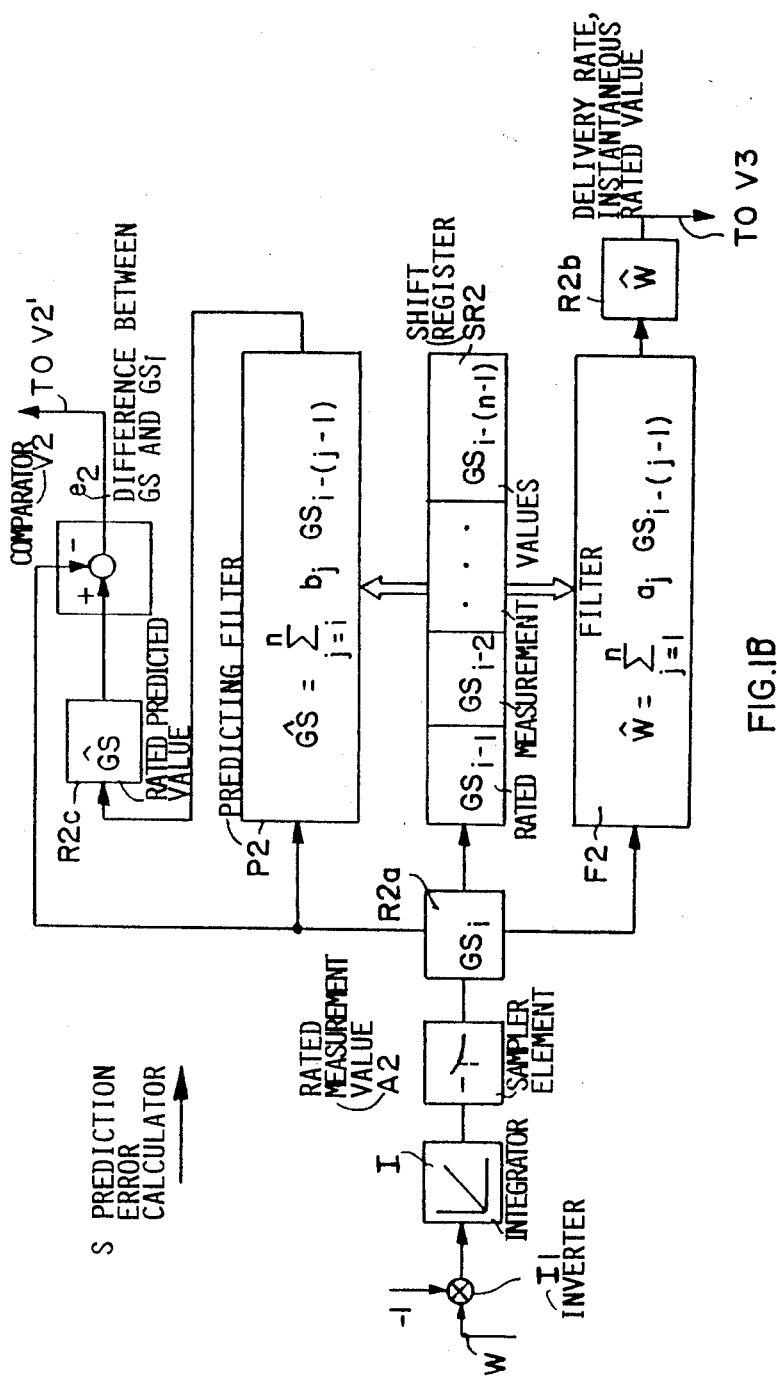
FIG. 1 (comprising FIGS. 1A, 1B and 1C) is a schematic block diagram of a correcting control system for eliminating interfering or disturbing effects in differential dosing scales.
Figure 1C:
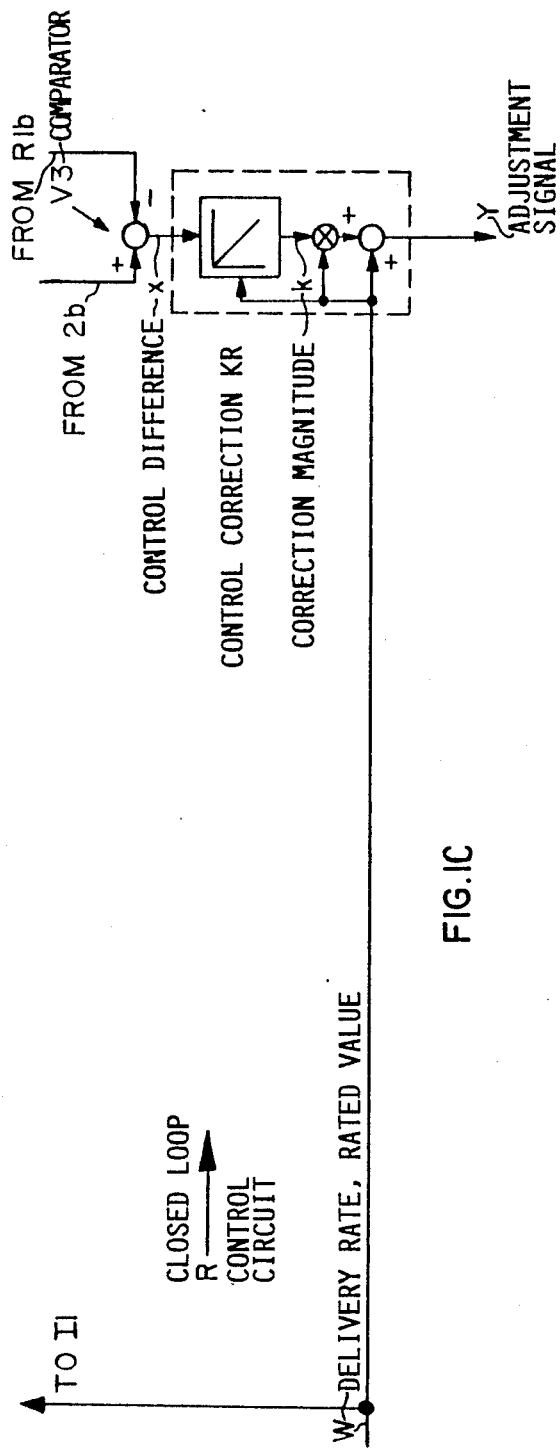

As shown in FIG. 1, the measured signal G output from a weighing cell WZ, such as a load cell for example, is amplified if necessary in an amplifier VS, and is then repeatedly sampled by a sampler element A1, such as a sample and hold amplifier and a A/D converter. The output of the sampler A1 is a series of separate discrete values for the weight which is to be determined. The current discrete measured value $G_i$ is stored in a register R1a and, after being tested as described below, is supplied to a correction circuit K, which essentially includes a digital filter F1, a shift register SR1, a digital forecast filter or predicting filter P1, a comparator V1, an evaluation circuit AU, the register R1a and additional registers R1b and R1c. The measured values are taken as a basis for calculations in the filter F1, predicting filter P1, shift register SR1, etc. The shift register SR1 has a length, or rather number of stages $n-1$, and stores $n-1$ past values of the sampled values, namely the measured values $G_{i-1}, G_{i-2}, \ldots G_{i-(n-1)}$. The current or latest sampled measured value $G_i$ is stored in the register R1a.

The current measured value $G_i$ and the past values of the shift register SR1 are used to calculate the instantaneous material delivery rate P in the filter F1 and to predict the next sampled value of the weighing cell signal, i.e. the predicted container weight or predicted fill weight G, in the predicting filter P1. After the calculation operation has been carried out in the filters F1 and P1, the values in the shaft register SR1 are all shifted by one position to the right. The instantaneous calculated delivery rate value P is delivered, for example, by a register R1b, as an actual value to the controller R for carrying out the rated-actual value comparison. The predicted fill weight value G is transferred to a register R1c, and at the next sampling step is available for comparison with the new sampled value $G_{i+1}$. The registers R1b and R1c may alternatively be integrated into the filters F1 and P1 respectively.

The filter F1 and the predicting filter P1 function in the same manner. They carry out a weighted averaging of the $n-1$ past values $G_{i-1}, G_{i-2}, \ldots, G_{i-(n-1)}$ stored in the shift register SR1 and of the current instantaneous measured value $G_i$. Specifically, the filter F1 calculates the instantaneous delivery rate P as $$P = \sum_{j=1}^{n} a_j G_{1-(j-1)}.$$

The predicting filter P1 calculates the predicted fill weight G as $$G = \sum_{j=1}^{n} b_j G_{i-(j-1)}.$$

The coefficients $a_j$ and $b_j$ multiplied with the past values retrieved from the shift register SR1, are derived according to any of the current methods of digital filtering technology (FIR filters), for example according to the method of least squares. After each operation or sampling and calculating step, the actual value of the delivery rate P, for example in kilograms per hour (kg/h), is available at the output of the filter F1, and the predicted value G for the next measured or sampled value of the weighing cell signal, for example in kilograms (kg), is available at the output of the predicting filter P1.

In order to carry out the test of the instantaneous current measured value $G_i$ mentioned above, this value $G_i$ is first compared to the predicted value G stored in the register R1c. This predicted value G had been calculated by the predicting filter P1 in the previous calculation cycle or sampling step. In order to carry out the comparison, at the beginning of each new sampling cycle the predicted value G and the new current measured value $G_i$ are each supplied to the comparator V1. The comparator V1 calculates a difference $e_i$ between its two inputs G and $G_i$, for example by simple subtraction. The difference $e_i$ is supplied to a further comparator V2', to form the difference e as described below, which is then supplied to the evaluation circuit AU. In the evaluation circuit AU, a limit value or tolerance range $e_{max}$ for the deviation or difference e may be set or adjusted, for example by means of an adjustment device E. If the difference e lies below the tolerance value $e_{max'}$, then the new measured value $G_i$ is evaluated as described above.

If the actual deviation or difference e exceeds or falls outside of the set tolerance range $e = -e_{max}$ to $e_{max}$, then the shift register SR1 is re-initialized, that is to say, it is reloaded with new values. In order to achieve this, a so-called back-calculation based on the last instantaneous measured value $G_i$ and on the last value of the delivery rate P, is performed in the evaluation circuit AU to determine new values for the shift register SR1. Thus, when an excessive disturbance occurs, the calculation of the delivery rate P by the filter F1 and of the predicted values G by the predicting filter P1 is carried out with the back-calculated past values $G_{i-1}, G_{i-2}, \ldots, G_{i-(n-1)}$ and the current measured value $G_i$.

Figure 2:
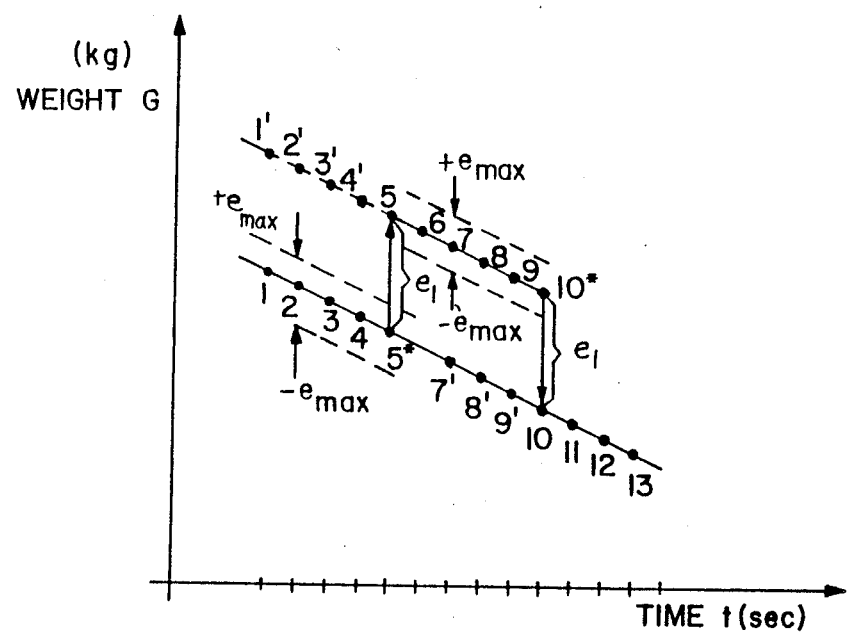
FIG. 2 is a diagram of delivered weight as a function of time, showing an interfering disturbance and its suppression in a differential dosing scale.

FIG. 2 shows the course of a disturbance of the measured weighing cell signal G or more specifically of the sampled weight values represented by this signal, showing the weight as a function of time. For the measured values at points 1–4, the actual measured values $G_i$ correspond well with the respective predicted values G of the predicting filter P1, and all values lie below the allowable tolerance value $e_{max}$, so that the correction circuit K is not activated and the controller R operates in the usual manner.

However, the predicted value G at the point 5* does not correspond with the actual measured weight value at the same time at point 5, due to the assumed disturbance at this time. The difference $e_l$ between the predicted weight G and the actual measured weight $G_i$ is large enough so that the reference difference e exceeds the tolerance range $e_{max}$ as described above. Thus, the correction circuit K is activated. Based on the actual measured value $G_i$ at point 5 and the course of the instantaneous delivery rate P or the previously measured values at points 4, 3 . . . , the evaluation circuit AU back-calculates the values for the points 4', 3', . . . , and loads these values into the shift register SR1. Thus, the values at 4', 3', . . . , are derived from the values at 4, 3, . . . , and the difference $e_1$. This operation does not influence the value of the delivery rate P which remains constant, as can also be seen in FIG. 2 where the delivery rate is given respectively as the slope of the line connecting the sample points. As shown, the line through the points 1, 2, 3, 4, is parallel to the line through the points 1', 2', 3', 4', 5. The predicting filter P1 calculates the new predicted value G for the measured value at point 6, etc. using the new values in the shift register SR1 and current measured value $G_i$ as starting data.

As long as the new predicted values G the actual measured values $G_i$ measured in the following sampling cycles lie within the prescribed tolerance range, the control continues to operate in the usual manner, that is to say, the correction circuit K is not activated. When another disturbance occurs, or when the previous disturbance ends, for example, when the predicted value at point 10* does not correspond with the measured value at the same time at point 10, the correction circuit K is activated and the same correcting procedure as described above is initiated again. In this case, the correction proceeds with back-calculating the values at points 9', 8', 7', . . . , loading these values into the shift register SR1, calculating a new predicted value for point 11, etc.

The present method reduces substantially the effects of disturbances. For a certain class of disturbances the effects may even be completely eliminated. The example shown in FIG. 2 represents the effect of some foreign object being placed on the scale and subsequently being removed again during the continued operation of the scale. This example is one of the cases in which the effects of the disturbances are completely eliminated by the method of the invention. The control, integration, and indication functions continue without any noticeable transitions or changes.

The method may be employed in the described manner. A further embodiment of the method of the invention takes changes in the rated value of the delivery rate into account in addition to the disturbances mentioned above.

When the rated value W of the delivery rate is changed, the allowable disturbance deviation or the tolerance range allowed for a potential disturbance can be adapted to the new rated value. For this purpose, the time response of the control path and the time response of the prediction filter must be taken into account. This is achieved by means of simulation of the control path and the signal processing in a circuit arrangement shown as the prediction error calculator S in the center portion of FIG. 1.

In a manner similar to the correction circuit K, the prediction error calculator S essentially comprises a integrator I, a sample element A2, filter F2, a shift register SR2, a predicting filter P2, and registers R2a, R2b, and R2c. The operation of the circuit arrangement of the prediction error calculator S is similar to that of the correction circuit K. The desired rated value W for the delivery rate is inverted by simple multiplication by $-1$ in an inverter I1 and is then integrated in an integrator I which constitutes the simulation of the control path. The sign (−) shown ahead of the integrator I represents an inversion of the actual signal progression, that is, the normal reduction of weight of the material in the scale container. The output signal of the integrator I is then sampled by a sampler element A2 to form the rated measurement value $GS_i$ which is stored in the register R2a and is then input to the filter F2, the predicting filter P2, and the shift register SR2.

The instantaneous rated value W is calculated in the filter F2 and is available at the output of the filter F2 as $$W = \sum_{j=1}^{n} a_j GS_{i-(j-1)}$$

and is then stored in the register R2b as an input to the controller R. A rated prediction value GS is calculated in the filter P2 and is available at the output of the predicting filter P2 as $$GS = \sum_{j=1}^{n} b_j GS_{i(j-1)}.$$

The value GS is stored in the register R2c to be compared to the rated or expected value $GS_i$ in the following sampling or measurement cycle in the comparator V2. The deviation or prediction error $e_2$ formed in the comparator V2 as $GS - GS_i$ only has a magnitude when the rated value of the delivery rate has been changed. The difference $e_2$ input to the comparator V2' which forms the reference difference e as described above.

Thus, as long as the rated value W of the delivery rate remains constant, no difference is calculated in the comparator V2, that is, the output signal $e_2$ remains zero. When the rated value W is changed, that is, when a different delivery rate is desired a difference $e_2$ arises in the comparator V2 corresponding to the difference $e_l$ currently calculated in the comparator V1, because the correction circuit K, or rather the predicting filter P1, has similarly determined the deviation of the measured value from the predicted value. The differences $e_l$ and $e_2$ cancel each other in the comparator V2', so that the correction circuit K is, in effect, not activated by a change in the rated value W. Hence, it becomes possible to adjust the response sensitivity of the correction circuit K as high as is desired, without having to consider normal changes of the rated value which may occur during operation.

The controller R essentially comprises a comparator V3 for comparing the actual delivery rate P with the instantaneous rated value W of the delivery rate, and a correction controller KR which provides the adjustment signal Y for the drive of the dosing equipment.

Specifically, a prescribed rated value signal for the delivery rate W is compared in the comparator V3 with the actual value P determined by the correction circuit K to form the control difference x which is supplied to the correction controller KR. The instantaneous rated value W may for example be determined and provided by the calculator S as described above.

Furthermore, the rated value W for the delivery rate is directly supplied to the controller R. A correction magnitude k is formed in the correction controller KR, so that the correction controller KR derives an adjustment signal Y from the delivery rate rated value W and the magnitude k. In the example embodiment described, the signal Y controls or affects the discharge rate or the delivery rate of material from the dosing scale during operation. This is achieved for example by controlling the rotational speed of an extraction or conveyor screw extracting material from the scale container in response to the signal Y. Here, the adjustment or drive arrangement, such as the motor of the extraction screw, responds to the adjustment Y practically without any hesitation or delay. It is possible to use the rated value signal W for the forward drive control.

The described signal processing and control may be realized either in hardware, i.e., in the form of integrated circuits, or in software, i.e., in microprocessors or computers running appropriate programs.

All the components of FIG. 1 are, as such, conventional and are realized in a computer such as bilog 780A. The filters F1, F2, P1, P2 are digital filters capable of performing the calculations in accordance with the equations set forth in each block.

Although the invention has been described with reference to specific example embodiments, it will be appreciated, that it is intended to cover all modifications and equivalents within the scope of the appended claims.

What we claim is:

1. A method for controlling a differential dosing scale, especially for dosing loose bulk materials, comprising the following steps:
   (a) repeatedly sampling and measuring an output signal (G) from a weighing sensor of said dosing scale to form a series of measured values ($G_{i-1}$, $G_i$, $G_{i+1}$, $G_{i+2}$, ...,);
   (b) successively storing each of said measured values in a register (R1a) and supplying stored values from said register (R1a) in parallel to a first digital calculating filter (F1), a first shift register (SR1), and a digital predicting filter (P1) communicating with each other;
   (c) calculating in said first calculating filter (F1) an actual delivery rate (P) from said series of measured values (..., $G_{i-1}$, $G_i$, ...,);
   (d) predicting in said first predicting filter (P1) from values ($G_i$, $G_{i-1}$, $G_{i-2}$, ...,) measured during a previous sampling cycle, a predicted value (G) for a value ($G_{i+1}$) next to be measured, and storing said predicted value (G) in a register (R1c);
   (e) comparing in a first comparator (V1) said predicted value (G) with the next actually measured value ($G_{i+1}$) to form a first difference value ($e_1$);
   (f) prescribing a permissible tolerance value ($e_{max}$) for said first difference value ($e_1$);
   (g) determining in an evaluation circuit (AU) whether said first difference value ($e_1$) exceeds said tolerance value ($e_{max}$) due to a disturbance in said output signal (G);
   (h) said calculating step (c) including calculating, in response to said first difference value ($e_1$) not exceeding said tolerance value ($e_{max}$), the actual value of the delivery rate (P) in said first calculating filter (F1) and storing the so calculated actual delivery rate (P) in a register (R1b), said predicting step (d) including predicting, in response to said first difference value ($e_1$) exceeding said tolerance value ($e_{max}$) thereby noting said disturbance, a new predicted value (G) for the next actual value to be measured based on the last actually measured value while holding said actual delivery rate (P) constant, whereby said actual delivery rate (P) and said predicted value (G) are each determined from past values ($G_{i-1}$, $G_{i-2}$, ..., $G_{i(n-1)}$) stored in said shift register (SR1) and from said current measured value ($G_i$);
   (i) activating through said comparator, said evaluation circuit (AU) in response to said first difference value ($e_l$) exceeding said tolerance value ($e_{max}$) defining a disturbance, for reloading said shift register (SR1) with new values based on the most recent actual measured value ($G_i$) to that the same delivery rate (P) is determined in said calculating filter (F1) as before said disturbance occurred and a predicted value (G) corresponding to a most recent actual measured value ($G_i$) and to the delivery rate (P) is determined in said predicting filter (PI) and is stored in said register (R1c); and
   (j) performing a closed loop control of said delivery rate of said differential dosing scale based on said first difference value, and, in the case of a disturbance in said output signal (G), continuing said closed loop control of said delivery rate based on said constant actual delivery rate (P).

2. The method of claim 1, further comprising the step by suppressing said first difference value ($e_1$) by comparing it with a second difference value ($e_2$) to form a reference difference value (e) which is evaluated instead of said first difference value ($e_1$) relative to said tolerance value ($e_{max}$), when a rated delivery value (W) of the delivery rate is changed.

3. The method of claim 1, wherein said closed loop control involves forming a control signal (Y) based on said actual delivery rate (P), on an instantaneous rated delivery value (W), and on a rated delivery value (W).

4. The method of claim 3, comprising applying said rated delivery value (W) to an integrator (I) in a prediction error calculator after being scaled as necessary, sampling an output of said integrator (I) to form a rated measurement value ($GS_i$) which is stored in a register (R2a) and is then applied to a filter (F2) to a shift register (SR2), to a calculating estimating filter (P2), and to a comparator (V2) for forming a rated estimated value (GS) in said calculating estimating filter (P2) during the previous measuring cycle, and storing said rated estimated value (GS) in a register (R2c), comparing the last sampled rated measurement value ($GS_i$) and said rated estimated value (GS) in said comparator (V2) to determine a second difference value ($e_2$), supplying said second difference value ($e_2$) to a further comparator (V2') where it is compared with said first difference value ($e_1$) to form a reference difference value (e) which is applied to an evaluation circuit (AU), forming an instantaneous rated value (W) of the delivery rate in said filter (F2) for comparison with the actual value (P) and forming a rated estimated value (GS) in said calculating estimating filter (P2) for storing said rated estimated value (GS) in a register (R2c), whereby said instantaneous rated value (W) and said rated estimated value (GS) are determined from the past values ($GS_{i-1}$, $GS_{i-2}$, ..., $GS_{i-(n-1)}$) which are stored in said shift register (SR2) and from said rated measurement value ($GS_i$).

5. A system for controlling the dosing of loose bulk material, comprising a differential dosing scale, a material storage container, material discharge means for extracting and discharging said loose bulk material from said container, weighing means (WZ) for weighing said loose material, said weighing means including means for generating a measured output weight signal (G), control means (R) for controlling the delivery rate of material from said material discharge means; correction circuit means (K) for providing a corrected delivery rate signal (P), said correction circuit means being connected between said control means (R) and said means for generating said measured output signal, said correction circuit means (K) comprising a first calculating digital filter (F1), a first shift register (SR1), a first predicting digital filter (P1), a first comparator (V1), and an evaluation circuit (AU); first sampling means (A1) for sampling said output signal (G), whereby sampled measured values ($G_i$) of said output signal (G) are each input to said first calculating filter (F1), to said first shift register (SR1), to said first predicting filter (P1), to said first comparator (V1), and to said evaluation circuit (AU), whereby said first calculating filter (F1) outputs an actual value of said delivery signal rate (P) and said first predicting filter (P1) outputs a predicted value (G) for the next measured value (G), and said first comparator (V1) compares said last measured value ($G_i$) and said predicted value (G) to form a first difference value ($e_1$), and wherein in the event that said first difference value ($e_1$) exceeds an allowable tolerance value ($e_{max}$), said evaluation circuit (AU) performs a back-calculation to provide new values for said first shift register (SR1) based on said last measured value ($G_i$) and on said delivery signal rate (P).

6. The system of claim 5, further comprising a prediction error calculator (S) connected to said correction circuit (K) and comprising an integrator (I) receiving at its input a rated value (W) of the delivery rate, second sampling means (A2) connected to an output of said integrator (I), a second digital calculating filter (F2), a second shift register (SR2), a second predicting digital filter (P2), and two second comparators (V2) and (V2'), whereby the output of said sampling means (A2) is applied to said second calculating filter (F2), to said second shift register (SR2), to said second predicting filter (P2), and to one (V2) of said second comparators (V2), another (V2') of said second comparators being connected to receive an output of said one comparator (V2) and an output of said first comparator (V1), an output of said other comparator (V2') being connected to said evaluation circuit (AU) thereby linking said prediction error calculator (S) to said correction circuit (K), wherein said second calculating filter (F2) generates an instantaneous value for the rated delivery rate (W) for comparison to the actual value (P), and wherein said second predicting filter (P2) generates a rated predicted value (GS) of the next sampled rated measurement value ($GS_i$).

7. The system of claim 6, further comprising a first register (R1a) arranged upstream of said first calculating filter (F1) and upstream of said first predicting filter (P1), a second register (R2a) arranged upstream of said second calculating filter (F2) and upstream of said predicting filter (P2), a third register (R1b) arranged downstream of said first calculating filter (F1), a fourth register (R1c) arranged downstream of said first predicting filter (P1), a fifth register (R2b) arranged downstream of said second calculating filter (F2), and a sixth register (R2c) arranged downstream of said second predicting filter (P2).

* * * * *

UNITED STATES PATENT AND TRADEMARK OFFICE
CERTIFICATE OF CORRECTION

PATENT NO. : 4,977,526

DATED : December 11, 1990

INVENTOR(S) : Gerhard Jost, et al

It is certified that error appears in the above-identified patent and that said Letters Patent is hereby corrected as shown below:

In [57] Abstract, lines 8 and 11, replace "(G)" by --($\hat{G}$)--;

line 15, replace "(P)" by --($\hat{P}$)--.

Column 3, lines 58, 65, replace "P" by --$\hat{P}$--;

line 63, replace "shaft" by --shift--;

lines 61 & 68, replace "G" by --$\hat{G}$--.

Column 4, line 10, line 13 (in formula), line 28, line 59, and line 62, replace "P" by --$\hat{P}$--;

line 13 (in formula), replace "$G_1$" by --$G_i$--;

line 16, 19 (in formula), line 30, line 35, line 36, line 40, line 43 (first occurrence), and line 63, replace "G" by --$\hat{G}$--;

line 51, replace "$e_{max'}$," by --$e_{max'}$--.

Col. 5, lines 3, 8, 12 (1st occurrence), 29 and line 33, replace "G" by --$\hat{G}$--.

line 17, line 23, replace "P" by --$\hat{P}$--;

line 33, before "the" (second occurrence) insert --and--.

UNITED STATES PATENT AND TRADEMARK OFFICE
CERTIFICATE OF CORRECTION

PATENT NO. : 4,977,526

DATED : December 11, 1990

INVENTOR(S) : Gerhard Jost, et al

It is certified that error appears in the above-identified patent and that said Letters Patent is hereby corrected as shown below:

Column 6, line 23, and line 28 (in formula), replace "W" by --$\hat{W}$--;

line 32, line 37 (in formula), line 39, line 43 (first occurrence) replace "GS" by --$\hat{GS}$--;

line 45, after "$e_2$" insert --is supplied as one--.

line 65, replace "P" by --$\hat{P}$--;

line 66, replace "W" by --$\hat{W}$--.

Column 7, line 3, replace "P" by --$\hat{P}$--;

line 6, replace "W" by --$\hat{W}$--;

line 29, replace "bilog 780A" by --Zilog Z80A--;

Claim 1, Column 7, line 53, replace "(P)" by --($\hat{P}$)--;

line 57, line 59, and line 61, replace "(G)" by --($\hat{G}$)--.

Column 8, line 4, line 6, line 12, line 13, line 24, line 28, line 35, replace "(P)" by --($\hat{P}$)--;

line 10, line 14, line 26, replace "(G)" by --($\hat{G}$)--;

line 23, replace "to" by --so--;

UNITED STATES PATENT AND TRADEMARK OFFICE
CERTIFICATE OF CORRECTION

PATENT NO. : 4,977,526

DATED : December 11, 1990

INVENTOR(S) : Gerhard Jost, et al

It is certified that error appears in the above-identified patent and that said Letters Patent is hereby corrected as shown below:

Claim 1, Column 8, line 29, replace "(PI)" by --(P1)--;

Claim 2, Column 8, line 37, replace "by" (first occurrence) by --of--.

Claim 3, Column 8, line 45, replace "(P)" by --($\hat{P}$)--;

line 46, replace "(W)" by --($\hat{W}$)--, (first occurrence).

Claim 4, Column 8, line 55, line 57, line 59, line 67, and line 68, replace "(GS)" by --($\hat{GS}$)--, line 68, replace "for" by --and--;

line 65, replace "(W)" by --($\hat{W}$)--;

line 66, replace "(P)" by --($\hat{P}$)--.

Column 9, line 2, replace "(W)" by --($\hat{W}$)--, replace "(GS)" by --($\hat{GS}$)--.

UNITED STATES PATENT AND TRADEMARK OFFICE
CERTIFICATE OF CORRECTION

PATENT NO. : 4,977,526
DATED : December 11, 1990
INVENTOR(S) : Gerhard Jose, et al It is certified that error appears in the above-identified patent and that said Letters Patent is hereby corrected as shown below:

Claim 5, Column 9, line 17, line 31, replace "(P)" by $--(\hat{P})--$;
line 32, line 35, replace "(G)" by $--(\hat{G})--$;
line 33, replace "(G)" by $--(G_i)--$;
Column 10, line 2, replace "(P)" by $--(\hat{P})--$.
Claim 6, Column 10, line 23, replace "(W)" by $--(\hat{W})--$, replace "(P)" by $--(\hat{P})--$;
line 25, replace "(GS)" by $--(\hat{GS})--$.

Signed and Sealed this

Twenty-second Day of June, 1993

Attest:

MICHAEL K. KIRK

*Attesting Officer*     *Acting Commissioner of Patents and Trademarks*